United States Patent [19]

Hendrickson

[11] Patent Number: 5,125,442
[45] Date of Patent: Jun. 30, 1992

[54] WOOD COMPONENT ATTACHMENT METHOD

[75] Inventor: Leslie B. Hendrickson, Roseau, Minn.

[73] Assignee: Marvin Lumber and Cedar Co., Warroad, Minn.

[21] Appl. No.: 642,349

[22] Filed: Jan. 17, 1991

[51] Int. Cl.⁵ .................................. B27F 7/00
[52] U.S. Cl. ...................... 144/353; 52/403
[58] Field of Search ............ 144/353; 52/396, 403, 52/586

[56] References Cited

U.S. PATENT DOCUMENTS 4,599,841 7/1986 Haid ........................... 52/403

Primary Examiner—W. Donald Bray
Attorney, Agent, or Firm—Lawrence M. Nawrocki

[57] ABSTRACT

A method for employment in securing together wood components whcih are intended to be mated one to another. The method includes a first step of forming slots in engaged surfaces of the wood components, the slots being registered one with another when the components are at intended relative positions. Consequently, the slots are, when the components are engaged in such a manner, aligned along an axis. An attachment fitting is provided to effect the securing function. Such a fitting would, typically, include an elongated spanning member having a central portion and first and second distal portions. Each distal portion carries a resilient barb, the barb extending outwardly and toward the central portion of the spanning member. In effecting securement of the wood components, the components are disengaged from one another, and the first distal portion of the attachment device is inserted into the slot of one of the wood components. The second wood component is, thereafter, brought toward the first wood component so that the second distal portion of the spanning member enters the slot formed in the second wood component. The components are, thereafter, urged together to be held in a mated configuration by the barbs of the attachment fitting.

1 Claim, 1 Drawing Sheet

WOOD COMPONENT ATTACHMENT METHOD

TECHNICAL FIELD

The present invention deals broadly with the field of woodworking. More specifically, however, the invention is related to technology for securing together wood components, such as millwork components, in an intended configuration.

BACKGROUND OF THE INVENTION

A plethora of products are made from wood. The products to which the present invention particularly applies can be characterized as millwork products. It will be understood, however, that the invention has applications beyond such products.

Millwork products include window and door components such as door frames, including jambs and headers, and window sashes, including stiles and rails. Such items are formed from wooden parts which are secured together.

In the prior art, affixation of one wooden component to another was effected in a number of ways including use of epoxies, other adhesives, nails, screws, and corrugated fasteners. All of those modalities have their favorable points and are advantageous in certain circumstances. All, however, also have drawbacks. For example, epoxies and other adhesives can be messy and pose waste disposal problems. Various of the methods provide for unsightly appearance.

It is to these drawbacks and dictates of the prior art that the present invention is directed. It is an improved fastening apparatus and method which function to solve many of the problems of the prior art.

SUMMARY OF THE INVENTION

The present invention is a device for securing together two wood components. The device is specifically intended for use to secure together two wood components wherein each has a slot formed therein, one slot being in registration with the other and aligned along an axis when components are engaged in a manner as when they are mated. The device includes an elongated spanning member which has a central, unbarbed portion and distal portions at first and second ends. The first distal portion carries a first resilient barb, and the second distal portion carries a second resilient barb. The respective barbs extend outwardly and toward the central portion of the spanning member. Each barb is intended to be received in the slot of one of the wood components. The distal portions of the spanning member, including respective barbs, are sized so that a dimension of each, perpendicular to an axis of elongation of the spanning member, is greater than the width of a slot in which a respective barb is to be received. Such sizing functions to preclude, or at least inhibit, retraction of the spanning member from the two slots.

In a preferred embodiment of the invention, each barb comprises a pair of laterally extending wings. One wing of each pair is disposed on either side of the respective distal portion of the spanning member. Both wings of each pair extend outwardly and toward the central portion of the spanning member, and, it is intended, both wings of each pair are symmetrical with respect to each other.

In the preferred embodiment also, each distal portion carries a plurality of axially-spaced barbs. Such axially-spaced barbs, it is intended, would be constructed as discussed above and would function to effect a better grip within a particular slot when the distal portion of the elongated spanning member is received within its respective slot. That is, for example, two barbs could be formed on each distal portion of the spanning member and received within the respective slot. Consequently, there will be two axially-spaced locations at which gripping is accomplished in each slot.

The present invention also includes a method for securing adjacent wood components together. The method includes the steps of forming slots in surfaces of the wood components, which slots are registered and aligned when the components are in engagement in a manner as when they are mated. The method further includes a step of providing an attachment fitting as previously described with regard to the apparatus invention. In preforming the method, the wood components are held spaced from one another (that is, disengaged). The first distal portion of the attachment fitting, including its respective barb, is inserted into its corresponding slot in one of the wooden components. When the fitting is so inserted, the second distal portion of the device is left extending out of the wood component. The second wood component is then brought toward the first wood component so that the second distal portion of the spanning member, including its respective barb, enters the slot formed in the second wood component. The two components are then, urged together so that they are held tightly in engagement as a result of the barbs deforming inwardly and engaging inner surfaces of their respective slots.

The present invention is thus an improved apparatus and method for securing wood components together in an attached configuration. More specific features and advantages obtained in view of those features will become apparent with reference to the DETAILED DESCRIPTION OF THE INVENTION, appended claims, and accompanying drawing figures.

DETAILED DESCRIPTION OF THE INVENTION

Figure 1:
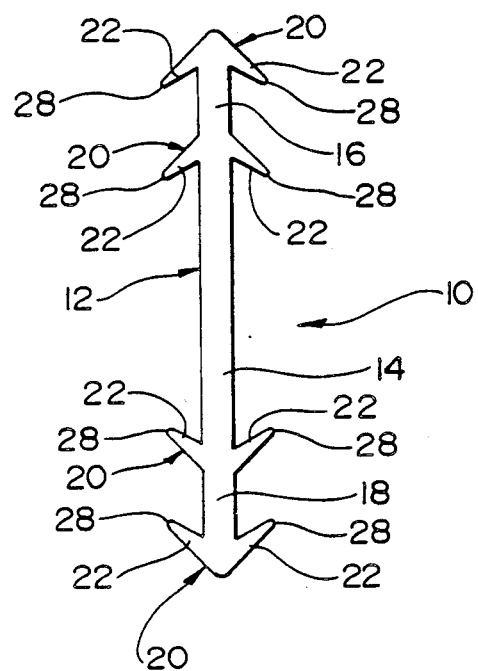
FIG. 1 is a profile view of a fitting in accordance with the present invention.

Referring now to the drawing, wherein like reference numerals denote like elements through the several views, FIG. 1 illustrates a fitting 10 in accordance with the present invention. The fitting 10 includes a spanning member 12 which, it is intended, extends generally linearly. The member 12 has a central, unbarbed portion 14 and two opposite distal portions 16, 18. The distal portions 16, 18 are provided with barbs as will be discussed hereinafter.

FIG. 1 illustrates a fitting 10 wherein the spanning member distal portions 16, 18 are each provided with two axially-spaced barbs 20 having dual wings 22. It will be understood, however, that other constructions are contemplated by the invention. For example, fittings 10 having barbs 20 with only a single wing 22, or having more or less than two axially-spaced barbs 20 are encompassed by the invention.

The barbs 20 are made of a resilient material in order to allow deformation in a manner as will be discussed hereinafter. While, conceivably, the spanning member 12 could be formed of a different, rigid material, it is thought to be more economical to manufacture the overall fitting 10 homogeneously. That is, the full fitting 10 could be molded or extruded so that all portions thereof are formed from a common resilient material. The preferred embodiment contemplates use of polyvinyl chloride as the material. It will be understood, however, that other materials can also function to effect performance of the invention.

FIG. 1 illustrates plural multi-winged barbs 20. Each wing 22 is shown as extending, while it extends outwardly, in a direction toward the central portion 14 of the elongated spanning member 12. That is, barb wings 22 proximate the outer extremeties of the fitting 10 turn inwardly toward the central portion 14 thereof. The same would be true of a fitting 10 having, for example, four wings spaced at 90° from one another, or for that matter, an annular barb.

In view of the fact that the barbs 20 are resilient, as one distal portion 16 of the spanning member 12 is urged into a relatively narrow slot 24 in a wood component 26, the barbs 20 will deform inwardly and toward the central portion 14 of the spanning member 12. It is intended that the width of the slot in one of the wood components be narrower than the dimension of a barb-carrying distal portion of the elongated spanning member 12 which extends in a direction generally transverse to the axis of elongation of the fitting 10. Thus, when one end of the fitting 10 is forced into a slot in a wood component, a tip or tips 28 of a barb 20 will engage the sides 30 of the slot to effect holding.

Figure 2:
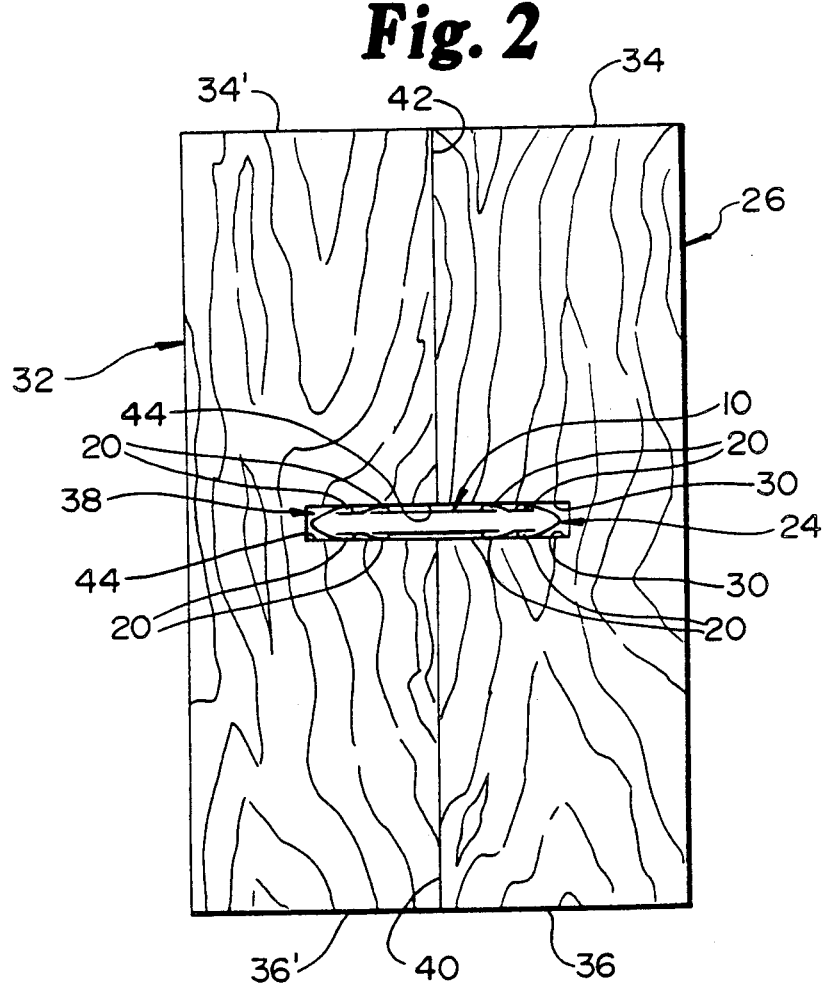
FIG. 2 is a side elevational detail view of the fitting shown in use.

As seen in FIG. 2, a fitting 10 in accordance with the present invention is intended to include a central and distal portion assembly, not including the laterally extending barbs 20, which is only slightly smaller than the slot within which the fitting 10 is intended to be received. As a result, the barbs 20 will be deformed a significant amount when the fitting 10 is received within the slot. Consequently, there will be a strong tendency for the barbs 20 to spring outward, and holding power will be maximized.

Referring again to FIG. 2, two wood components 26, 32 intended to be mated are illustrated. The two components 26, 32 are only for illustrative purposes, since wood components that would be mated would, typically, be more ornate and have a different shape rather than the two rectangular shapes shown. Such shapes were shown, however, merely for demonstrative purposes and ease of illustration.

It will be assumed, for purposes of discussion, that the two components 26, 32 are intended to be aligned with upper edges 34, 34' flush with each other and lower edges 36, 36' flush with each other as illustrated. Slots 24, 38 are formed in surfaces 40, 42 of the components 26, 32 intended to be engaged by each other. The slots 24, 38 are formed so that they are registered with each other and so that they are aligned, along a linear axis, when the components 26, 32 are in their intended engagement.

A first distal portion 16 of the attachment device or fitting 10, including the barb 20 carried thereby, is inserted into the slot 24 in one of the wood components 26. The second distal portion of the device 10, including the barb 20 carried thereby, is left exposed, extending from the component 26 in which the first distal portion 16 has been received.

It will be noted that the barbs 20 on the first distal portion 16 have, at this point, deformed so that tips 28 of the barbs 20 have "dug into" the walls 30 of the slot 24 in which the distal portion 16 is received. Consequently, the fitting 10 will be securely attached to the first component 26.

With the first component 26 so disposed, the second component 32 is brought toward the first component 26 so that the second distal portion 18 of the spanning member 12, including the barb 20 carried thereby, enters the slot 38 formed in the second component 32. The two components 26, 32 are then urged into tight engagement, and the tips 28 of the barbs 20 carried by the second distal portion 18 of the spanning member 12 "dig into" the walls 44 of the slot 38 formed in the second component 32.

It will be understood that the aggregate length of the two slots 24, 38 is intended to be greater than the full axial dimension of the fitting 10. This is so since, if it were otherwise, while the fitting 10 might hold the two components 26, 32 together, it would, in effect, preclude engagement of the two wood components 26, 32 along their surfaces 40, 42.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. A method for securing together wood components to be mated, comprising the steps of:
   (a) forming registered slots in engaged surfaces of the wood components, the slots being aligned, when the components are engaged in a manner as when they are mated, along an axis;
   (b) providing an attachment fitting including:
      (i) an elongated spanning member having a central portion and first and second distal portions;
      (ii) a first resilient barb carried by said first distal portion of said spanning member, said first resilient barb extending outwardly and toward said central portion of said spanning member; and
      (iii) a second resilient barb carried by said second distal portion of said spanning member, said second resilient barb extending outwardly and toward said central portion of said spanning member;
   (c) disengaging the wood components from one another;
   (d) inserting the first distal portion of the attachment device, including said first barb, into the slot in one of the wood components, and leaving said second distal portion of the attachment device and said second barb extending from the wood component;
   (e) bringing the second wood component toward the first wood component so that said second distal portion of said spanning member, including said second barb, enters the slot formed in the second wood component;
   (f) urging the two wood components together, wherein they are held in a mated configuration as a result of the barbs deforming inwardly and engaging inner surfaces of their respective slots to preclude retraction.

* * * * *